United States Patent [19]

Steffen et al.

[11] 4,357,445

[45] Nov. 2, 1982

[54] PROCESS FOR THE PRODUCTION OF CROSS-LINKED GRAFT COPOLYMERS

[75] Inventors: Ulrich Steffen, Dormagen; Heinrich Alberts; Leo Morbitzer, both of Cologne, all of Fed. Rep. of Germany

[73] Assignee: Bayer Aktiengesellschaft, Leverkusen, Fed. Rep. of Germany

[21] Appl. No.: 238,998

[22] Filed: Feb. 27, 1981

[30] Foreign Application Priority Data

Mar. 7, 1980 [DE] Fed. Rep. of Germany ....... 3008747

[51] Int. Cl.³ ..................... C08L 51/00; C08F 263/04
[52] U.S. Cl. .................................... 525/244; 525/302; 525/304; 525/305; 525/306; 525/80
[58] Field of Search ................ 525/244, 302, 304–306

[56] References Cited

U.S. PATENT DOCUMENTS

| | | | |
|---|---|---|---|
| 3,111,500 | 11/1963 | Bartl et al. ........................... | 525/302 |
| 3,855,353 | 12/1974 | Alberts et al. ....................... | 525/302 |
| 4,071,580 | 1/1978 | Alberts et al. ....................... | 260/878 |
| 4,153,646 | 5/1979 | Steffen et al. ....................... | 260/878 |

*Primary Examiner*—Carman J. Seccuro
*Attorney, Agent, or Firm*—Connolly and Hutz

[57] ABSTRACT

A process for the production of cross-linked graft copolymers by the radically initiated precipitation copolymerization of an ethylene/vinyl ester copolymer as graft base and a mixture to be grafted of one or more aromatic monovinyl compounds, acrylonitrile and/or methacrylonitrile, a cross-linking agent containing two or more carbon-carbon double bonds, and, optionally, another monoolefinically unsaturated copolymerizable monomer wherein the ungrafted base is precipitated by the addition of a precipitating agent simultaneously with the precipitating cross-linked graft copolymer.

6 Claims, No Drawings

PROCESS FOR THE PRODUCTION OF CROSS-LINKED GRAFT COPOLYMERS

This invention relates to a process for the production of cross-linked graft copolymers from ethylene/vinyl ester copolymers, aromatic monovinyl compounds and (meth)acrylonitrile by precipitation polymerisation in which not only the cross-linked graft copolymer precipitates in the course of graft polymerisation in the presence of a cross-linking agent, but the dissolved, unreacted graft base is also precipitated by the addition of a precipitating agent.

Precipitation copolymerisation in organic media has certain process technical advantages over bulk polymerisation, such as low viscosity and efficient removal of heat, while compared with emulsion and suspension polymerisation, it has the advantage of producing less effluent since it requires no emulsifiers and any high molecular weight dispersing agents used are for the most part left in the polymer.

When grafting is carried out by precipitation polymerisation, the graft base is dissolved in a solvent which constitutes a precipitating agent for the graft polymer formed. According to German Offenlegungsschrift Nos. 2,215,588; 2,509,403 and 2,656,228, for example, grafting of styrene or of styrene-acrylonitrile mixtures on ethylene/vinyl ester copolymers having a vinyl ester content of from 30 to 80%, by weight, is carried out in tertiary butanol as solvent and precipitating agent.

The styrene/acrylonitrile copolymer formed and the ethylene/vinyl ester/styrene/acrylonitrile graft copolymer precipitate as a finely divided dispersion having particles of from 0.1 to 2 μm. The ungrafted portions of the ethylene/vinyl ester copolymer, however, are left in solution and if the solids content is greater than 30%, by weight, they result in a high viscosity and in incomplete mixing of the polymerisation components. If the dispersion is worked-up by precipitation in hot water and stripping using steam, a coarse product is obtained owing to the graft base dissolved therein. This is a disadvantage for drying and subsequent working-up, such as mixing and granulating. Even when evaporated using evaporator screws, these dispersions cause foaming and the formation of deposits in the evaporation housing.

It has now been found that the above-mentioned disadvantages of conventional precipitation polymerisation may be overcome if during graft copolymerisation, the dissolved graft base is also precipitated by the addition of a precipitating agent. Suitable cross-linking agents are added to the mixture of graft monomers so that the desired cross-linked products may be obtained.

The present invention relates to a process for the production of cross-linked graft copolymers by the radically initiated precipitation copolymerisation of (A) from 10 to 80%, by weight, preferably from 15 to 60%, by weight, of an ethylene/vinyl ester copolymer as graft base; and (B) from 90 to 20%, by weight, preferably from 85 to 40%, by weight, of a mixture to be grafted of:

(I) from 94 to 15%, by weight, preferably from 93.9 to 48%, by weight, of one or more aromatic monovinyl compounds;

(II) from 5 to 50%, by weight, preferably from 5 to 30%, by weight, of acrylonitrile and/or methacrylonitrile;

(III) from 1 to 20%, by weight, preferably from 1 to 10%, by weight, of a cross-linking agent containing two or more carbon-carbon double bonds; and (IV) from 0 to 15%, by weight, preferably from 0.1 to 12%, by weight, of another monoolefinically unsaturated copolymerisable monomer; such that the sum of (A) and (B) and (I) to (IV) is in all cases 100%, by weight, wherein the ungrafted base is precipitated by the addition of a precipitating agent simultaneously with the precipitating cross-linked graft copolymer.

To carry out the process according to the present invention, the ethylene/vinyl ester copolymer is dissolved. Suitable solvents include branched- and straight-chain $C_4$–$C_8$ monohydric alcohols and cycloaliphatic and aromatic, optionally halogenated, hydrocarbons. Tertiary butanol is preferably used.

Graft copolymerisation is started by the addition of the monomers, a cross-linking agent and a radical initiator. A precipitating agent for the ethylene/vinyl ester copolymer is slowly added at the same time. Water and $C_1$–$C_3$ alcohols are suitable precipitating agents for this purpose; water is preferably used. The addition of the monomers and of the initiator is continued during and after the process of precipitation and, when all the monomer and initiator has been added, polymerisation is continued until all the initiator has been used up.

The solids content of the resulting dispersion, which is highly fluid, may reach values of from 40 to 45%, by weight.

Working-up of the dispersion and separation of the polymers may be carried out by the conventional methods. Stripping using steam yields graft copolymers in the form of fine powders having a low residual monomer and solvent contents. After drying, the particles measure up to 1 mm in diameter.

Evaporation in evaporator screws yields a white, glossy granulate which also has a low residual monomer content. Foaming does not occur, so that evaporation may continue undisturbed for a considerable period of time.

The graft bases used are ethylene/vinyl ester copolymers containing from 25 to 75%, by weight, preferably from 35 to 50%, by weight, of vinyl esters incorporated by polymerisation. Vinyl esters of $C_1$–$C_{18}$ monocarboxylic acids, particularly of vinyl acetate, are suitable. The ethylene/vinyl ester copolymers generally have Mooney viscosities ML 4°/100° C. determined according to DIN 53523 of from 15 to 80, preferably from 20 to 45, and intrinsic viscosities $\eta$ of from 0.5 to 1.8 [dl/g] determined in THF. These copolymers are soluble in hydrocarbons and alcohols, particularly in tertiary butanol.

The monomers which may be grafted include (meth)acrylonitrile, styrene, α-methyl styrene and styrenes which are substituted in the nucleas, such as halogenated styrenes and alkylated styrenes having from 1 to 4 carbon atoms in the alkyl group. Styrene and acrylonitrile are preferred.

Other monoolefinically unsaturated, copolymerisable monomers which are active in graft polymerisation may also be used, such as vinyl chloride, (meth)acrylic acid, (meth)acrylic acid esters having from 1 to 22 carbon atoms in the alkyl group, (meth)acrylamide, α-olefins having from 2 to 18 carbon atoms and allyl compounds, such as diallyl carbonate, 1-butene-3,4-diol, 2-methylene-1,3-dihydroxy propane and 2-methylene-1,3-diacetoxy propane. These monomers are also referred to as grafting activators.

Suitable cross-linking agents include aromatic divinyl compounds, divinyl ethers, divinyl esters of $C_2$–$C_{10}$ dicarboxylic acids, diallyl and triallyl ethers and esters, esters of diols with $\alpha,\beta$-unsaturated $C_3$–$C_{10}$ monocarboxylic acids and unsaturated polyesters. The following are examples: divinyl benzene, butane diol diacrylate, glycol divinyl ether, divinyl adipate, allyl vinyl ether, diallyl fumarate, triallyl cyanurate and trimethylol propane triallyl ether.

The unsaturated polyesters are prepared by the known polycondensation of at least one $\alpha,\beta$-ethylenically unsaturated dicarboxylic acid or ester-forming derivative thereof, optionally mixed with up to 90 mol%, based on the unsaturated acid component, of at least one saturated dicarboxylic acid or ester-forming derivative thereof with at least one dihydric alcohol. Examples of preferred unsaturated dicarboxylic acids and derivatives thereof include: maleic acid, maleic acid anhydride and fumaric acid. Suitable saturated dicarboxylic acids and derivatives thereof include: phthalic acid, phthalic acid anhydride, isophthalic acid, succinic acid, adipic acid and sebacic acid.

Examples of suitable dihydric alcohols include: ethylene glycol, propane-1,2-diol, propane-1,3-diol, diethylene glycol, butane-1,3-diol, butane-1,4-diol, neopentyl glycol and hexane-1,6-diol.

The unsaturated polyesters preferably used are synthesized from maleic acid, up to 25 mol % of which may be replaced by phthalic or isophthalic acids, and ethylene glycol, propane-1,2-diol, diethylene glycol and dipropylene glycol.

The acid numbers of the polyesters are from 1 to 50, preferably from 5 to 25, the hydroxyl numbers from 1 to 100, preferably from 20 to 50, and the molecular weights preferably from 700 to 3,000.

Unsaturated polyesters have the advantage over low molecular weight cross-linking agents that they are precipitated with the ethylene/vinyl ester copolymers and therefore result in a high cross-linking density in the dispersed particles. The quantity of cross-linking agent may be used from 1 to 20%, by weight, preferably from 1 to 10%, by weight, based on the total quantity of monomers.

The graft copolymerisation may be started by irradiation or by initiators which yield radicals. Suitable polymerisation initiators include azo-compounds, such as azo-bis-isobutyric acid nitrile and particularly percompounds, such as isopropyl peroxy dicarbonate, $\alpha$-ethylhexyl peroxydicarbonate, cyclohexyl peroxy dicarbonate, tertiary butyl perpivalate, tertiary butyl peroctoate, tertiary butyl per-neodecanoate, diacetyl peroxide, lauroyl peroxide, succinyl peroxide and dibenzoyl peroxide.

The initiator concentration may be from 0.1 to 1.0%, by weight, preferably from 0.3 to 0.5%, by weight, based on the quantity of monomer mixture. Graft copolymerisation may be carried out at temperatures of from 40° to 250° C., preferably from 60° to 120° C., depending on the initiators used.

Graft copolymerisation carried out by the process according to the present invention generally does not require the addition of dispersing agents since the ethylene/vinyl ester copolymers act as dispersers. The use of an additional dispersing agent reduces the size of the particles and after completion of the precipitation of graft base it increases the velocity of polymerisation and rate of conversion of the monomers.

Examples of dispersing agents include: polyvinyl alcohol, partially saponified polyvinyl acetate, cellulose derivatives, such as methyl- or $\beta$-hydroxyethyl-cellulose, styrene-acrylic acid copolymers or saponified styrene-maleic acid anhydride copolymers, methacrylic acid-methylmethacrylate copolymers, polyethylene oxide, polyacrylamide and polyacrylic acid.

The quantity of dispersing agents used is from 0.01 to 3%, by weight, preferably from 0.1 to 1.0%, by weight, based on the liquid phase.

The finely divided cross-linked graft copolymers prepared by the process according to the present invention are not soluble in toluene or THF, but merely swell in these solvents. The swelling factors in THF at 25° C. vary from 5 to 50, depending on the quantity of cross-linking agent used.

The base in these graft copolymers is to a large extent grafted and therefore cross-linked. Only from 15 to 25% of the quantity of ethylene/vinyl ester copolymer put into the process may be extracted from the products by exhaustive extraction using tertiary butanol at 80° C. The material extracted consists mainly of low molecular weight constituents which escape grafting and cross-linking. If the products have been prepared without the aid of cross-linking agents, on the other hand, from 30 to 50% of unreacted graft base may be extracted.

The graft copolymers produced by the process according to the present invention, which have graft base contents of from 40 to 60%, by weight, are suitable as weathering resistant modifying agents to increase the impact strength of resins which are not sufficiently tough. The graft copolymers may be mixed with the resins in kneaders or extruders at temperatures of from 180° to 280° C. The melt viscosity barely differs from that of the pure resins. Extruded or injection moulded articles have a high surface gloss.

The following Examples illustrate the present invention. Percentages are in all cases percentages, by weight.

EXAMPLE 1

3,300 g of an ethylene/vinyl acetate copolymer (EVA) containing 45%, by weight, of polymerised vinyl acetate and having a Mooney viscosity of 20 are dissolved in 10,200 g of tertiary butanol and 2,000 g of water in a 40 liter autoclave at 85° C. A mixture of 2,920 g of styrene, 1,080 g of acrylonitrile, 400 g of n-butylacrylate, 80 g of divinyl benzene and 100 g of a polyethylene oxide having a molecular weight of 20,000 is then pumped in and the temperature is adjusted to 85° C. 30% of a solution of 20 g of tertiary butyl perpivalate, 20 g of water and 200 g of tertiary butanol are then pumped in immediately and the remainder in 1 hour. At the same time, the addition of 5,000 g of water is begun. The pumping time is 1.5 hours. Polymerisation is continued for 2 hours until the initiator is completely used up. A finely divided dispersion having a solids content of 20.1%, by weight, is obtained. When the product has been worked-up in hot water and dried, 6,500 g of a graft copolymer having an EVA content of 45.5%, by weight, is obtained in the form of a fine powder. Its gel content in tetrahydrofuran is 72%, by weight.

EXAMPLE 2

3,300 g of EVA are dissolved in a 40 liter autoclave as described in Example 1. To this solution are added 2,920 g of styrene, 1,180 g of acrylonitrile, 80 g of butyl acrylate, 100 g of a polyethylene oxide having a molecular weight of 20,000 and 500 g of a 60% solution in styrene of an unsaturated polyester of maleic acid, propane diol and phthalic acid. 100 g of propylene are then introduced under pressure as grafting activator. Graft polymerisation is started at 90° C. by pumping in a solution of 20 g of benzoyl peroxide, 500 g of tertiary butanol and 400 g of styrene. The addition of 5,000 g of water, which is carried out over a period of 2 hours, is begun at the same time. Polymerisation is then continued for 2.5 hours at 80° C. until all the initiator has been used up. A finely divided dispersion having a solids content of 29%, by weight, is obtained. After precipitation of the polymer with ethanol and drying at 60° C., a finely powdered graft copolymer having an EVA content of 61.5%, by weight, is obtained. The gel content of the graft copolymer in THF is 79%, by weight.

We claim:

1. A process for the production of a cross-linked graft copolymer by the radically initiated precipitation copolymerization of:
   (A) from 10 to 80%, by weight, of an ethylene/vinyl ester copolymer as graft base; and
   (B) from 90 to 20%, by weight, of a mixture to be grafted of
      (I) from 93.9 to 48%, by weight, of styrene;
      (II) from 5 to 30%, by weight, of acrylonitrile;
      (III) from 1 to 10%, by weight, of a cross-linking agent having two or more carbon-carbon double bonds, and
      (IV) from 0.1 to 12%, by weight, of another monoolefinically unsaturated copolymerizable monomer; such that the sum of (A) and (B) and (I) to (IV) is in each case 100%, by weight, wherein the ungrafted base is precipitated by the addition of a precipitating agent simultaneously with the precipitating cross-linked graft copolymer.

2. A process according to claim 1, wherein the ungrafted base is precipitated by the addition of water, methanol or ethanol during graft copolymerisation.

3. A process according to claim 1, wherein the proportion of solvent to precipitating agent is from 5:1 to 1:1.

4. A process according to claim 1, wherein the compounds used as cross-linking agent (III) are selected from the group consisting of aromatic divinyl compounds, divinyl ethers, divinyl esters of $C_2$–$C_{10}$ dicarboxylic acids, diallyl and triallyl ethers and esters and esters of diols with $\alpha,\beta$-unsaturated $C_3$–$C_{10}$ mono-carboxylic acids.

5. A process according to claim 1, wherein the cross-linking agents (III) used are polyesters of diols with $\alpha,\beta$-unsaturated dicarboxylic acids.

6. A process according to claim 1, wherein the copolymerisable monomers (IV) used are selected from the group consisting of vinyl chloride, $\alpha$-olefins having from 2 to 18 carbon atoms, (meth)acrylic acid and amides thereof and $C_1$–$C_{12}$ alkyl esters thereof, diallyl carbonate, 1-butene-3,4-diol and 1,3-dihydroxy- and 1,3-diacetoxy-2-methylene propane.

* * * * *